United States Patent
Nakayama

(10) Patent No.: US 8,416,465 B2
(45) Date of Patent: Apr. 9, 2013

(54) READER, AND COMPUTER READABLE MEDIUM AND METHOD THEREFOR

(75) Inventor: Hiroto Nakayama, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 614 days.

(21) Appl. No.: 12/708,028

(22) Filed: Feb. 18, 2010

(65) Prior Publication Data

US 2010/0214625 A1    Aug. 26, 2010

(30) Foreign Application Priority Data

Feb. 25, 2009    (JP) .................................. 2009-042813

(51) Int. Cl.
*H04N 1/40* (2006.01)

(52) U.S. Cl.
USPC ........... 358/448; 358/1.9; 358/1.13; 358/452; 358/462; 358/474

(58) Field of Classification Search ......................... None
See application file for complete search history.

(56) References Cited

U.S. PATENT DOCUMENTS

| | | | |
|---|---|---|---|
| 6,233,057 B1* | 5/2001 | Ota .............................. | 358/1.13 |
| 7,092,111 B2* | 8/2006 | Nishikawa et al. ............ | 358/1.1 |
| 7,268,909 B2* | 9/2007 | Nakagiri ...................... | 358/1.16 |
| 7,391,985 B2 | 6/2008 | Hosoi | |
| 8,078,078 B2* | 12/2011 | Matsumoto .................... | 399/82 |
| 8,125,693 B2* | 2/2012 | Arai ............................. | 358/462 |
| 8,270,025 B2* | 9/2012 | Xu ................................. | 358/1.6 |
| 2005/0134871 A1* | 6/2005 | Nakagiri ...................... | 358/1.6 |
| 2006/0061833 A1* | 3/2006 | Kikuchi et al. ............... | 358/474 |
| 2006/0182457 A1 | 8/2006 | Hosoi | |
| 2006/0290974 A1 | 12/2006 | Kano et al. | |
| 2007/0273914 A1* | 11/2007 | Hosoda ......................... | 358/1.14 |
| 2008/0180716 A1 | 7/2008 | Miyata | |
| 2009/0080033 A1* | 3/2009 | Arai ............................. | 358/462 |
| 2009/0190143 A1* | 7/2009 | Matsumoto ................... | 358/1.1 |
| 2009/0244586 A1* | 10/2009 | Sei .............................. | 358/1.13 |

FOREIGN PATENT DOCUMENTS

| | | |
|---|---|---|
| JP | 2-123870 A | 5/1990 |
| JP | 8-079499 A | 3/1996 |
| JP | 2005-73036 | 3/2005 |
| JP | 2005-142770 A | 6/2005 |
| JP | 2005-191886 | 7/2005 |
| JP | 2006-108775 A | 4/2006 |
| JP | 2006-227286 A | 8/2006 |
| JP | 2007-006020 A | 1/2007 |
| JP | 2008-186262 A | 8/2008 |
| JP | 2009-88599 A | 4/2009 |
| JP | 2009-94598 A | 4/2009 |

* cited by examiner

OTHER PUBLICATIONS

Notification of Reasons for Rejection mailed Dec. 21, 2010 in corresponding JP Patent Application No. 2009-042813 together with English-language translation.

*Primary Examiner* — Dung Tran

(74) *Attorney, Agent, or Firm* — Scully, Scott, Murphy & Presser, P.C.

(57) ABSTRACT

A reader includes a reading unit configured to read image data on both sides of each of document sheets, a determining unit configured to make a determination as to whether a predetermined one of both sides of each of the document sheets is blank, based on the image data read by the reading unit, and a classifying unit configured to classify the image data read from each of the document sheets into one of different groups, based on the determination made by the determining unit.

13 Claims, 8 Drawing Sheets

FIG.4A

Do you permit interruption of another user during document processing?
▲ Yes
▼ No ※ Precaution for obverse-side reading
Please select "No" when the document contains a sheet that does not have a blank reverse side.

FIG.4B

Do you permit interruption of another user during document processing?
▲ Yes
▼ No ※ Precaution for double-side reading
Please select "No" when the document contains a sheet that has a blank reverse side.

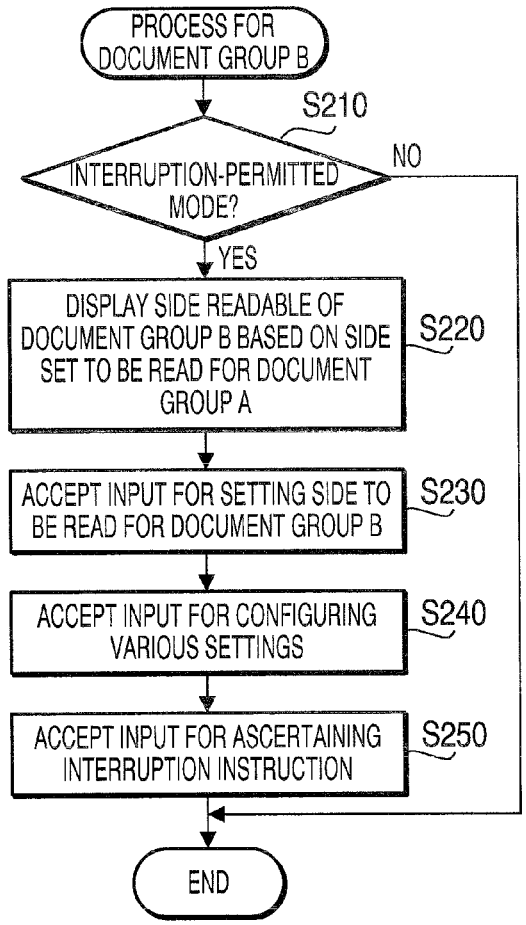

FIG. 5

| DOCUMENT GROUP A | | DOCUMENT GROUP B | |
|---|---|---|---|
| SIDE TO BE READ | REQUIREMENTS FOR REVERSE SIDE (TO BE CONFIRMED BY USER) | READABLE SIDE | REQUIREMENTS FOR REVERSE SIDE (TO BE CONFIRMED BY USER) |
| OBVERSE SIDE | BLANK | REVERSE SIDE/BOTH SIDES | DATA CONTAINED |
| BOTH SIDES | DATA CONTAINED | OBVERSE SIDE | BLANK |
FIG. 6
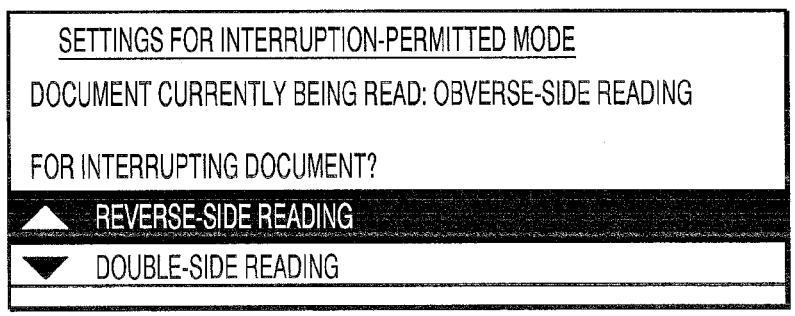
FIG. 7A
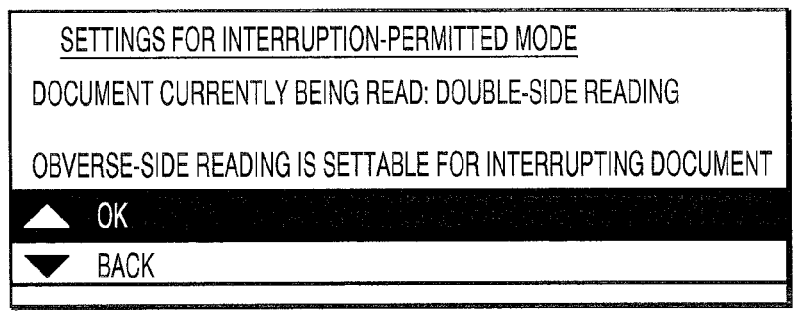
FIG. 7B

READER, AND COMPUTER READABLE MEDIUM AND METHOD THEREFOR

CROSS-REFERENCE TO RELATED APPLICATION

This application claims priority under 35 U.S.C. §119 from Japanese Patent Application No. 2009-042813 filed on Feb. 25, 2009. The entire subject matter of the application is incorporated herein by reference.

BACKGROUND

1. Technical Field

The following description relates to one or more techniques applicable to a reader configured to read a document.

2. Related Art

An automatic document feeder (ADF) has been known which is configured to sequentially feed a plurality of document sheets set in a feed position. Additionally, for an ADF capable of reading both sides of a document sheet at a single feeding operation, a technique has been proposed which allows a second (later) reading operation to interrupt a first (earlier) reading operation (hereinafter, simply referred to as "interruption").

SUMMARY

In order to attain the interruption in the aforementioned technique, after removing a document group A already set in the feed position for the first reading operation (e.g., a facsimile transmission operation), a user has to set in the feed position a document group B that is to be read in the second reading operation (e.g., a copy operation) to interrupt the first reading operation for the document group A. Then, after completion of the second reading operation for the document group B, the user has to reset the document group A in the feed position.

Thus, the aforementioned technique unfortunately places such a burden on the user. Moreover, even in the case of a simple sequential reading operation (which proceeds as follows: reading the document group A→reading the document group B→end) as well, after the document group A is completely read, a certain kind of user operation is required (e.g., setting the document group B in the feed position after confirming that the document group A is completely read).

Aspects of the present invention are advantageous to provide one or more improved techniques that make it possible to reduce user efforts required for reading a plurality of document groups with a reader.

According to aspects of the present invention, a reader is provided, which includes a reading unit configured to read image data on both sides of each of document sheets, a determining unit configured to make a determination as to whether a predetermined one of both sides of each of the document sheets is blank, based on the image data read by the reading unit, and a classifying unit configured to classify the image data read from each of the document sheets into one of different groups, based on the determination made by the determining unit.

According to aspects of the present invention, further provided is a computer readable medium having computer readable instructions stored thereon. When executed by a processor configured to read a document, the instructions cause the processor to perform a reading step of reading image data on both sides of each of document sheets, a determining step of making a determination as to whether a predetermined one of both sides of each of the document sheets is blank, based on the image data read in the reading step, and a classifying step of classifying the image data read from each of the document sheets into one of different groups, based on the determination made in the determining step.

According to aspects of the present invention, further provided is a method adapted to be implemented on a processor configured to read a document. The method includes a reading step of reading image data on both sides of each of document sheets, a determining step of making a determination as to whether a predetermined one of both sides of each of the document sheets is blank, based on the image data read in the reading step, and a classifying step of classifying the image data read from each of the document sheets into one of different groups, based on the determination made in the determining step.

BRIEF DESCRIPTION OF THE ACCOMPANYING DRAWINGS

FIGS. 4A and 4B exemplify setting screens for accepting an input as to whether to permit interruption in the first embodiment according to one or more aspects of the present invention.

FIG. 5 is a flowchart showing a procedure of a process for a document group B in the first embodiment according to one or more aspects of the present invention.

FIG. 6 is a table exemplifying requirements for the interruption in the first embodiment according to one or more aspects of the present invention.

FIGS. 7A and 7B exemplify setting screens for setting a side to be read for the document group B in the first embodiment according to one or more aspects of the present invention.

Figure 8:
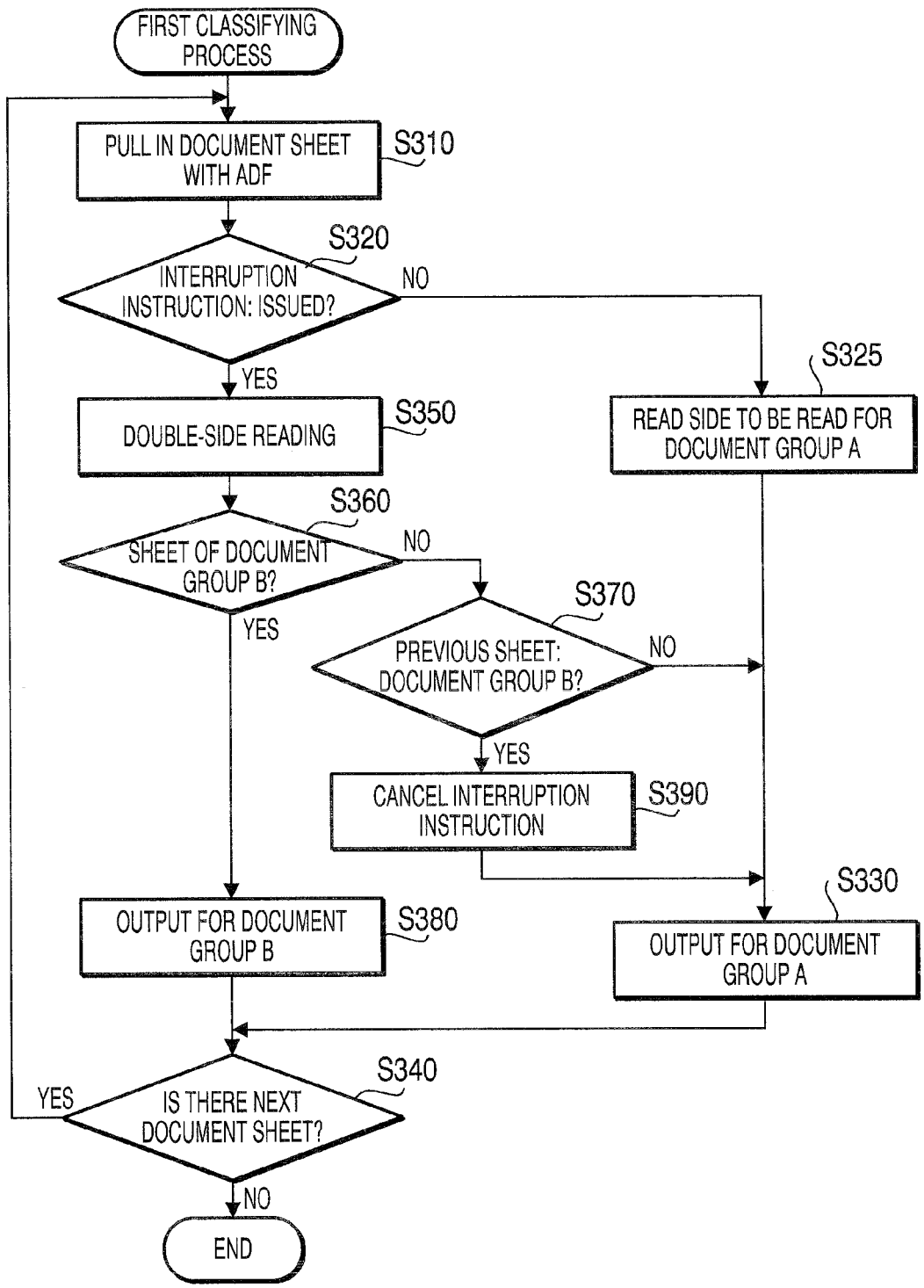

FIG. 8 is a flowchart showing a procedure of a first classifying process in the first embodiment according to one or more aspects of the present invention.

Figure 9:
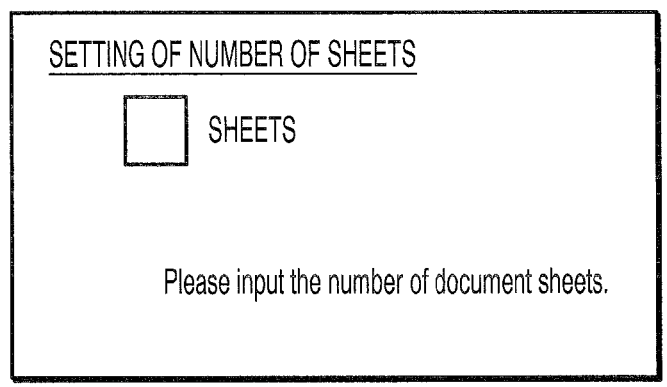

FIG. 9 exemplifies a setting screen for setting the number of sheets of the document group B in the first embodiment according to one or more aspects of the present invention.

Figure 10:
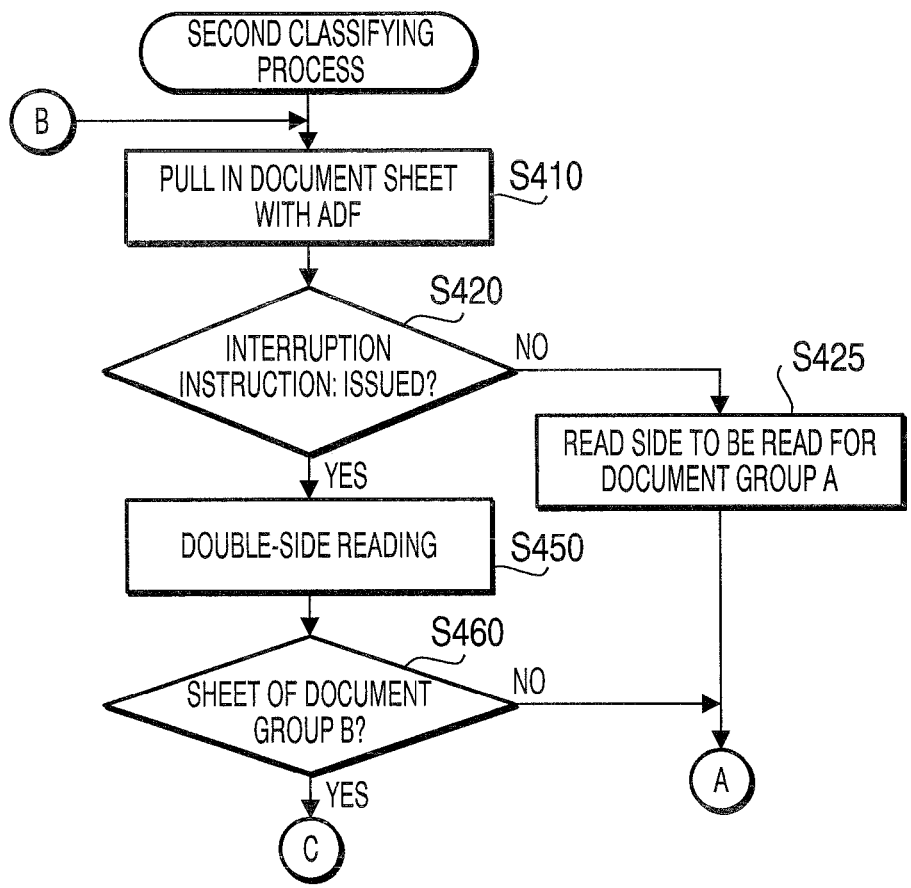
Figure 11:
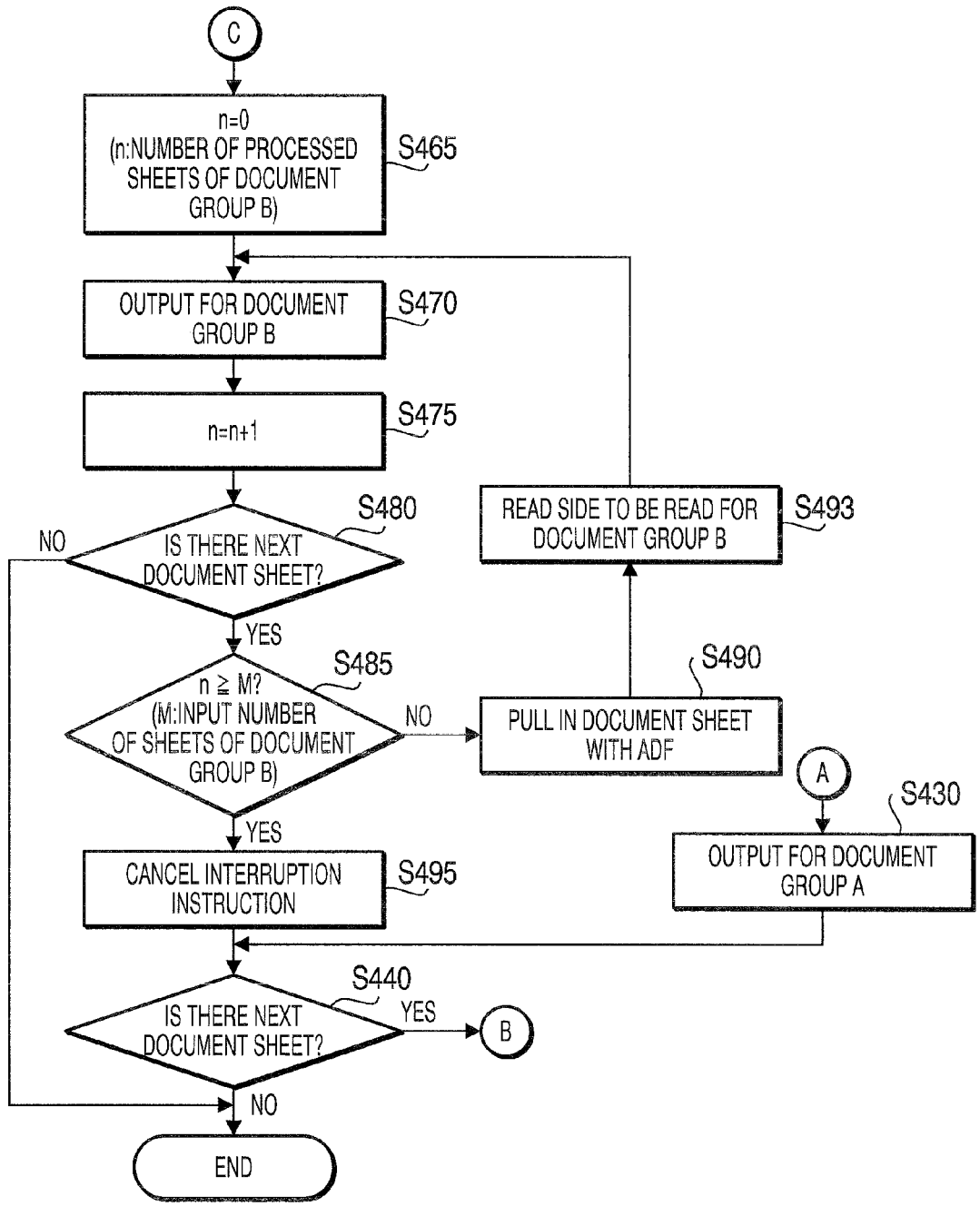

FIGS. 10 and 11 are flowcharts showing a procedure of a second classifying process in a second embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompany drawings.

[First Embodiment]

Figure 1:
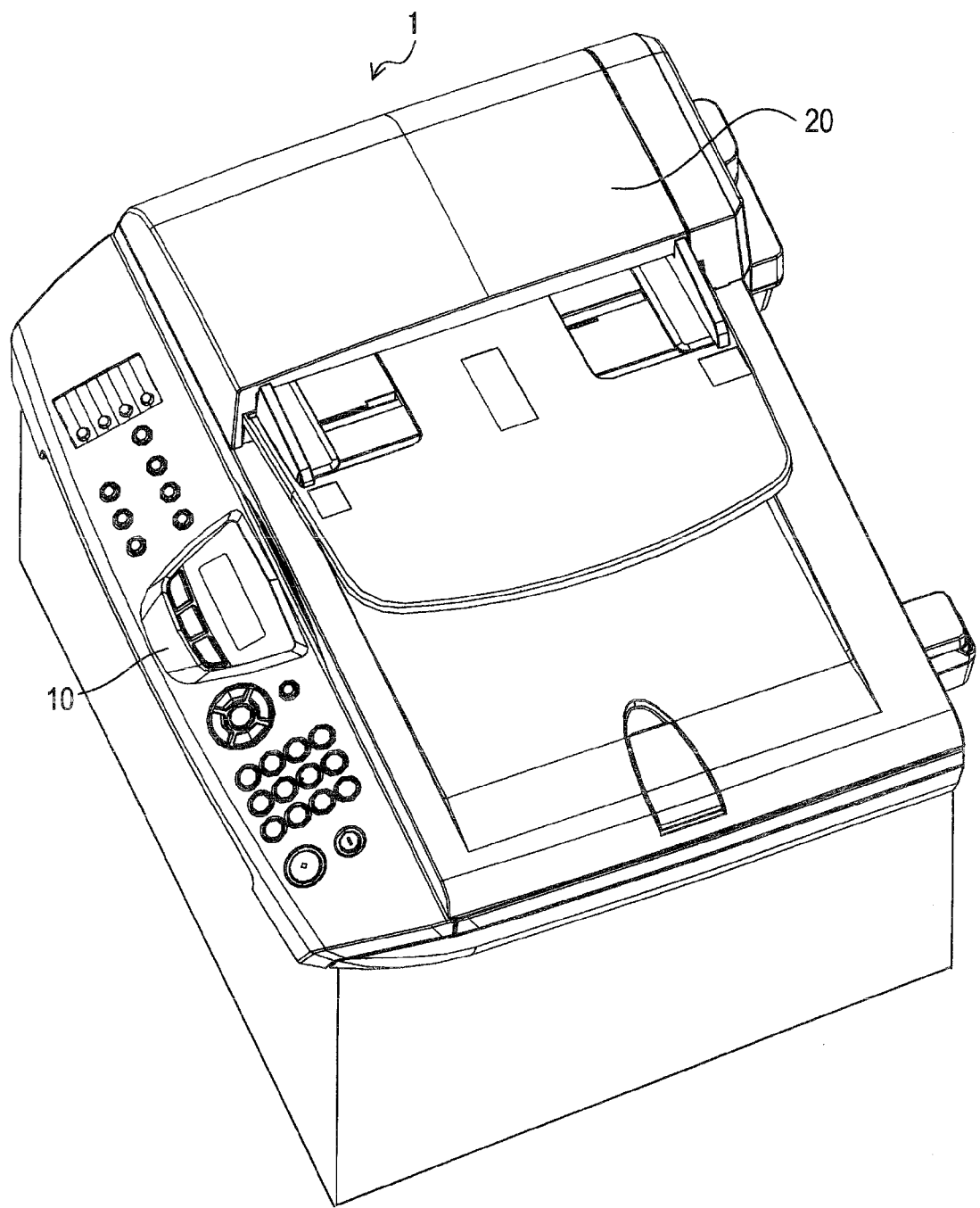
FIG. 1 is an external view of a multi-function peripheral (MFP) in a first embodiment according to one or more aspects of the present invention.

As illustrated in FIG. 1, a multi-function peripheral (MFP) 1 in a first embodiment according to the present invention is provided with an operation panel 10 and an automatic document feeder (ADF) 20. Further, the MFP 1 has various functions such as a facsimile function, a copy function, and a scanner function.

Figure 2:
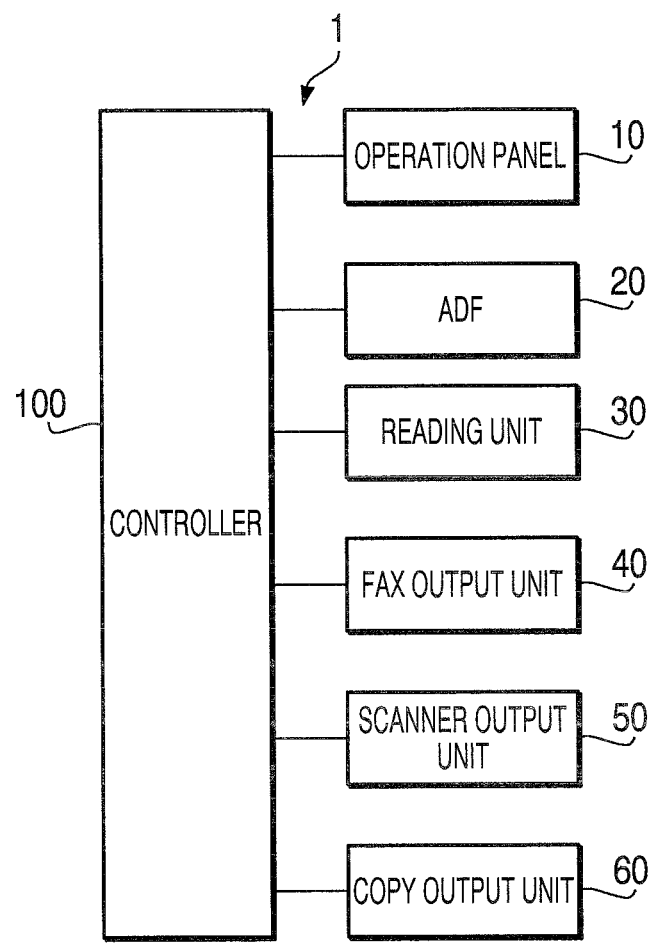
FIG. 2 is a block diagram schematically showing a configuration of the MFP in the first embodiment according to one or more aspects of the present invention.

As shown in FIG. 2, the MFP 1 includes a reading unit 30, a facsimile output unit 50, a scanner output unit 50, a copy output unit 60, and a controller 100, as well as the operation panel 10 and the ADF 20. The controller 100 is configured to take control of the operation panel 10, the ADF 20, the reading unit 30, the facsimile output unit 50, the scanner output unit 50, and the copy output unit 60.

Based on operation information input through the operation panel 10, the controller 100 controls the ADF 20 to pull in a document sheet and controls the reading unit 30 to read an image on the document sheet. Then, the controller 100 controls one of the facsimile output unit 40, the scanner output unit 50, and the copy output unit 60 to output the image read. It is noted that the facsimile output unit 40, the scanner output unit 50, and the copy output unit 60 are hardware resources to attain the facsimile function, the scanner function, and the copy function, respectively. The scanner output unit 50 is configured to transmit the read image to a PC or a server connected with the MFP 1 and/or to store the read image onto an internal storage unit of the MFP 1 or a storage medium removable relative to the MFP 1.

The reading unit 30 is configured to read both sides (an obverse side (first side) and a reverse side (second side)) of a document sheet with respective different sensors. The reading unit 30 can read only one of the first and second sides.

Figure 3:
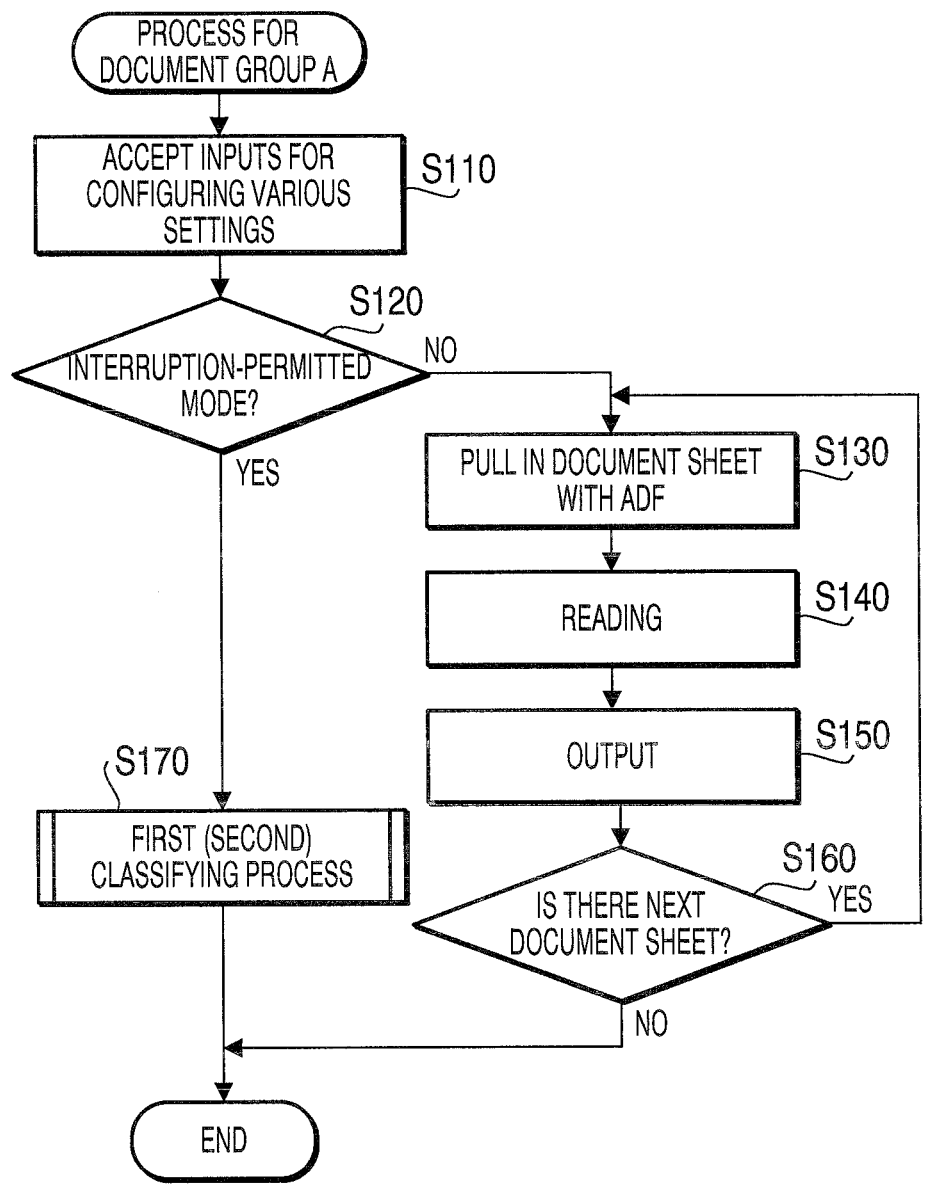
FIG. 3 is a flowchart showing a procedure of a process for a document group A in the first embodiment according to one or more aspects of the present invention.

FIG. 3 is a flowchart showing a procedure of a process for a document group A to be executed by the controller 100 of the MFP 1 The document group A represents a group of document sheets for which an operation may be interrupted by an operation for another document group in a below-mentioned process. The process for the document group A is started in response to receipt of an instruction to start the process for the document group A through the operation panel 10.

In the process for the document group A, the controller 100 initially accepts instructions to configure various settings through the operation panel 10 (S110). Specifically, the controller 100 accepts an instruction for selecting one of the copy function, the facsimile function, and the scanner function, and/or an instruction for selecting one of double-side reading and obverse-side (single-side) reading. Then, the controller 100 accepts an input as to whether to permit interruption during an operation of reading the document group A (see FIGS. 5 to 7) (S120).

The controller 100 accepts the input as to whether to permit interruption on a screen as illustrated in FIG. 4A (for the obverse-side reading) or 4B (for the double-side reading). On the screen shown in FIG. 4A or 4B, a user selects "Yes" for permitting the interruption or "No" for not permitting the interruption. In the obverse-side reading, when the document group A contains a document sheet with image data on the second side (reverse side) thereof, the user has to select "No" (see FIG. 6). Meanwhile, in the double-side reading, when the document group A contains a document sheet that has a blank reverse side, the user has to select "No" (see FIG. 6).

Referring back to FIG. 3, when accepting an instruction for not permitting the interruption (S120: No), the controller 100 controls the ADF 20 to pull in a document sheet (S130), controls the reading unit 30 to read an image on the document sheet (S140), and controls one of the facsimile output unit 40, the scanner output unit 50, and the copy output unit 60 to output the read image in accordance with the settings configured in S110 (S150). It is noted that the output operation implemented in S150 is not necessarily limited to an operation of, each time reading a page of image, completing output of the read image. For example, in the copy function, the controller 100 may sequentially perform a printing operation each time reading a page of image. Meanwhile, in the facsimile function, the controller 100 may perform an operation of storing read images in S150, and after reading and storing all pages of images, transmit all of the images at one time.

While there is a document sheet left on the ADF 20 (S160: Yes), the controller 100 repeats the steps of S130 to S150. When determining that there is no document sheet on the ADF 20 (S160: No), the controller 100 terminates the process for the document group A.

On the other hand, when accepting an instruction for permitting the interruption (S120: Yes), the controller 100 performs a first classifying process (see FIG. 8) (S170), and then terminates the process for the document group A. It is noted that a second classifying process will be set forth in a second embodiment.

Hereinafter, an interruption instruction will be explained. A process for a document group B shown in FIG. 5 is a process to be repeatedly performed in execution of the process for the document group A (nevertheless, it is noted that the process for the document group B is not performed until the interruption instruction is canceled in S390 after an affirmative determination is made in S320 (S320: Yes) in the first classifying process (see FIG. 8)). The document group B denotes a group of document sheets for which an operation will interrupt an operation for the document group A.

As illustrated in FIG. 5, in the process for the document group B, the controller 100 initially determines whether interruption is permitted (in other words, whether an interruption-permitted mode is set active) (S210). When determining that interruption is not permitted (S210: No), the controller 100 terminates the process for the document group B. Meanwhile, when determining that interruption is permitted (S210: Yes), the controller 100 displays readable side(s) of the document group B on the operation panel 10, based on the settings configured in S110 of the process for the document group A (S220). An explanation will be provided about the readable side(s) of the document group B with reference to FIG. 6.

A table as shown in FIG. 6 is previously stored on an internal memory of the MFP 1, which table shows requirements for realizing the interruption. When the obverse-side reading is set for the document group A, the user is, as mentioned above, required to confirm that each sheet of the document group A has a blank reverse side, in order to set the interruption-permitted mode active. It is noted that even though the document group A includes a document sheet that does not have a blank reverse side, the first classifying process (see FIG. 8) proceeds. However, since the first classifying process is configured under an assumption that each sheet of the document group A has a blank reverse side, the interruption may not normally be implemented. At this time (when the obverse-side reading is set for the document group A), the reverse side or the both sides are settable to be read for the document group B. Then, the user has to confirm that each sheet of the document group B has a reverse side with image data thereon.

Meanwhile, when the double-side reading is set for the document group A, the user is required to confirm that each sheet of the document group A has a reverse side with image data thereon, in order to set the interruption-permitted mode active. At this time, the obverse side is settable to be read for the document group B. Then, the user has to confirm that each sheet of the document group B has a blank reverse side. When the above requirements are satisfied, a document sheet read can be classified into one of the document group A and the document group B based on whether the document sheet has a blank reverse side.

In S220, the controller 100 displays on the operation panel 10 a screen as illustrated in FIG. 7A or 7B. As shown in FIG. 7A, when the side to be read for the document group A is an obverse side, the controller 100 prompts the user to select reverse-side reading or the double-side reading for the document group B. Further, as shown in FIG. 7B, when the document group A is set to be read in the double-side reading, the controller 100 prompts the user to provide an input as to whether to read the document group B in the obverse-side reading.

Referring back to FIG. 5, the controller 100 accepts an input for setting the side(s) to be read for the document group B through the screen as shown in FIG. 7A or 7B (S230). Then, the controller 100 accepts instructions to configure various settings (S240). Thereafter, the controller 100 accepts an input for ascertaining the interruption instruction (S250), and then terminates the process for the document group B. It is noted that after S250, the user is required to set the document group B on the ADF 20. This is because all document sheets are read and output under the settings for the document group A before the MFP 1 accepts the interruption instruction. The document group B may be set to cut in the document group A or to be read after the document group A is completely read. Thus, the first classifying process is launched in response to acceptance of the interruption instruction.

As illustrated in FIG. 8, in the first classifying process, the controller 100 first controls the ADF 20 to pull in a document sheet (S310). Then, the controller 100 determines whether there is an interruption instruction that has been issued (S320). When having accepted the input for ascertaining the interruption instruction in S250 (see FIG. 5), the controller determines that there is an interruption instruction that has been issued (S320: Yes). The determination is intended to prevent the double-side reading from being wastefully performed.

When determining that there is an interruption instruction that has been issued (S320: Yes), the controller 100 controls the reading unit 30 to read both sides of the document sheet, regardless of which side is set to be read for each of the document groups A and B (S350). Thereby, the controller 100 determines whether the document sheet pulled in S310 is classified into the document group B, based on whether the document sheet has a blank reverse side (S360). The determination is made by reference to the requirements for the reverse side shown in FIG. 6. For example, in the case where the side set to be read for the document group A is the obverse side, and the side set to be read for the document group B is the reverse side or the both sides, when the document sheet read has image data on the reverse side thereof, the controller 100 determines that the document sheet read is classified into the document group B. When determining that the document sheet read is classified into the document group A (S360: No), the controller determines whether the previous document sheet is classified into the document group B (S370). When determining that the previous document sheet is classified into the document group A (S370: No). the controller 100 outputs the image data read in S350 in accordance with the settings for the document group A (S330).

Then, the controller 100 determines whether there is a next document sheet left on the ADF 20 (S340). When determining that there is a next document sheet left on the ADF 20 (S340: Yes), the controller 100 goes back to S310. In other words, after the interruption instruction has been issued, while the ADF 20 is pulling in a document sheet of the document group A, the controller 100 repeats the aforementioned steps.

Meanwhile, when determining that the document sheet pulled in S310 is classified into the document group B (S360: Yes), the controller 100 outputs the image data read in S350 in accordance with the settings for the document group B (S380). Thereafter, the controller 100 advances to S340. In this case, while the ADF 20 is pulling in a document sheet of the document group B, the controller 100 repeatedly makes an affirmative determination in S360 (i.e., determines that the document sheet is classified into the document group B) (S360: Yes) and continuously outputs read data in accordance with the settings for the document group B.

When determining that the ADF 20 again pulls in a document sheet to be classified into the document group A (S360: No), since the previous document sheet is classified into the document group B (S370: Yes), the controller 100 cancels the interruption instruction (i.e., the controller 100 determines that the ADF 20 no longer pulls in a document sheet to be classified into the document group B) (S390). Then, the controller 100 outputs the read data in accordance with the settings for the document group A (S330). After that, when determining that there is a next document sheet left on the ADF 20 (S340: Yes), the controller 100 controls the ADF 20 to pull in a document sheet (S310). Subsequently, when determining that there is not an interruption instruction that has been issued (S320: No), the controller 100 controls the reading unit 30 to read the side(s), of the document sheet, set to be read for the document group A (S325). Thereafter, the controller 100 outputs the read data in accordance with the settings for the document group A (S330). Then, when determining that there is no document sheet left on the ADF 20 (S340: No), the controller 100 terminates the first classifying process.

It is noted that when an interruption instruction is issued again before the first classifying process ends, the controller 100 determines that there is an interruption instruction that has been issued (S320: Yes) and again performs output of a document group B.

According to the MFP 1 configured as above, it is possible to lighten a burden placed on the user who makes the MFP 1 read the document group B interrupting reading of the document group A for the following reason. Since a document sheet read is automatically classified into the document group A or the document group B, even though the MFP 1 is in the middle of reading the document group A, the user can set the document group B on the ADF 20 without having to remove the document group A from the ADF 20.

In the meantime, in order to classify a read document sheet into one of the document group A and the document group B, the MFP 1 has to read both sides of the document sheet. Nevertheless, before the interruption instruction is issued, or after the document group B is completely read after the interruption instruction is issued, the reading unit 30 is controlled to read the side(s), of the document sheet, set to be read for the document group A. Therefore, it is possible to avoid a wasteful reading operation that may be caused under such a setting as to read both sides of a document sheet in any case.

In addition, since the MFP 1 displays, on the operation panel 10, readable side(s) of the document group B, the MFP 1 is so user-friendly that the user can operate the MFP 1 in accordance with the information on the operation panel 10. Further, since the MFP 1 can be set to forbid the interruption, it is possible to prevent the MFP 1 from wrongly operating. Additionally, since the reading unit 30 performs a reading operation with the two sensors, the reading operation can be carried out in a simple and smooth manner.

[Second Embodiment]

Hereinafter, an explanation will be given about specific features of a second embodiment that differ from the first embodiment. The specific features of the second embodiment are an operation in S240 of the process for the document group B, and a second classifying process executed as an alternative to the first classifying process. Initially, S240 of the process for the document group B will be set forth. In S240 of the second embodiment, the controller 100 accepts the number of sheets included in the document group B (see FIG. 9), in addition to the instructions to configure various settings that are accepted in S240 of the first embodiment. The second classifying process will be described below with the numeral "M" that is assumed to represent the number of the sheets of the document group B.

As shown in FIG. 10, the controller 100 first controls the ADF 20 to pull in a document sheet (S410). Then, the controller 100 determines whether there is an interruption instruction that has been issued (S420). When determining that there is an interruption instruction that has been issued (S420: Yes), the controller 100 controls the reading unit 30 to read both sides of the document sheet, regardless of which side is set to be read for each of the document groups A and B (S450). Thereby, the controller 100 determines whether the document sheet pulled in S410 is classified into the document group B, based on whether the document sheet has a blank reverse side (S460). When determining that the document sheet pulled in S410 is classified into the document group A (S460: No), (note: subsequent steps are shown in FIG. 11), the controller 100 outputs the image data read in S450 in accordance with the settings for the document group A (S430).

Subsequently, the controller 100 determines whether there is a next document sheet left on the ADF 20 (S440). When determining that there is a next document sheet left on the ADF 20 (S440: Yes), the controller 100 goes back to S410 in FIG. 10.

Meanwhile, when determining that the document sheet pulled in S410 is classified into the document group B (S460: Yes), (note: subsequent steps are shown in FIG. 11), the controller 100 substitutes zero for a parameter "n" that represents the number of processed sheets of the document group B (S465). Then, the controller 100 outputs the read data in accordance with the settings for the document group B (S470). Next, the controller 100 increments the parameter "n" by one (S475). When determining that there is a next document sheet left on the ADF 20 (S480: Yes), the controller 100 determines whether the parameter "n" is equal to or more than "M" (S485). When determining that the parameter "n" is less than "M" (S485: No), the controller 100 controls the ADF 20 to pull in a document sheet (S490), and controls the reading unit 30 to read the side(s), of the document sheet, set to be read for the document group B (S493). Thereafter, the controller 100 goes back to S470.

Meanwhile, when determining that the parameter "n" is equal to or less than "M" (S485: Yes), the controller 100 cancels the interruption instruction (S495). Then, when determining that there is a next document sheet left on the ADF 20 (S440: Yes), the controller 100 goes back to S410 in FIG. 10. When another interruption instruction is not issued, the controller 100 makes a negative determination in S420 (i.e., determines that there is not an interruption instruction that has been issued) (S420: No). Thereafter, the controller 100 controls the reading unit 30 to read the side(s), of a pulled-in sheet, set to be read for the document group A (S425), and then goes to S430.

When another interruption instruction is issued, the controller 100 makes an affirmative determination in S420 (S420: Yes), and goes to S450. After that, the controller 100 determines that there is not a next document sheet left on the ADF 20 (S440: No, or S480: No), and terminates the second classifying process.

According to the second embodiment, the MFP 1 provides the same effects as the first embodiment. Further, the period, during which the MFP 1 is required to read both sides of a document sheet regardless of which side is set to be read for each of the document groups A and B, is limited to a period after the affirmative determination in S420 that there is an interruption instruction that has been issued (S420: Yes) is made until a first document sheet of the document group B is detected (S460: Yes). Hence, the period of the second embodiment is shorter than that of the first embodiment. Further, with respect to each document sheet other than the first sheet of the document group B, any requirement as to whether the document sheet has a blank reverse side is not imposed thereon.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

The classifying may be performed based on whether a document sheet has a blank obverse side. In this case, only the reverse side may be set to be read for the document group A. Further, in this case, each sheet of the document group A is required to have a blank obverse side. Furthermore, the obverse side or the both sides are settable to be read for the document group B, and each sheet of the document group B is required to have an obverse side with image data thereon.

Further, when the classifying is implemented based on whether a document sheet has a blank obverse side, a classifying way may be applied in which a document sheet with image data on the obverse side thereof and a document sheet having a blank obverse side are classified into the document group A and the document group B, respectively. In this case, even when the obverse-side reading is set for the document group A, it does not matter whether each sheet of the document group A has a blank reverse side.

Further, the classifying may be performed based on whether a document sheet has a plane side (e.g., an entirely-black side) even though the sheet does not have a blank side. Moreover, the reading unit 30 may not necessarily have two sensors, and may have just one sensor as far as the sensor can achieve the double-side reading.

Further, the MFP 1 may be configured to read both sides of each sheet in any case and classify the read sheet in any case. Specifically, the aforementioned configuration may be attained to, in the first classifying process, skip the steps S320, S370, and S390 in an unexecuted manner and perform the double-side reading in S325. In this case, it does not matter how a plurality of document groups are mixed. It is noted that the aforementioned classifying techniques may be applied to not only an MFP but also other devices configured to read a document.

What is claimed is:

1. A reader comprising:
a reading unit configured to read image data on both sides of each of document sheets;
a determining unit configured to make a determination as to whether a predetermined one of both sides of each of the document sheets is blank, based on the image data read by the reading unit; and
a classifying unit configured to classify the image data read from each of the document sheets into one of different groups, based on the determination made by the determining unit;
wherein the classifying unit comprises a mode changing unit configured to change a classifying mode from a first mode to a second mode in response to a predetermined instruction,
wherein the classifying unit is configured to, in the first mode, classify the read image data into a predetermined one of the different groups, regardless of the determination by the determining unit,
wherein the classifying unit is configured to, in the second mode, classify the read image data into one of the different groups, based on the determination by the determining unit, and
wherein the classifying unit is configured to, immediately after the reading unit starts to read the image data of the document sheets, classify the read image data into the predetermined group in the first mode,
wherein the classifying unit is configured to, in the first mode, classify the read image data into a first group, regardless of the determination by the determining unit,
wherein the classifying unit is configured to, in the second mode, classify the read image data into one of the first group and a second group different from the first group, based on the determination by the determining unit,
wherein the classifying unit is configured to, when the determining unit makes an initial determination that meets a requirement for the second group after the mode changing unit changes the classifying mode from the first mode to the second mode in response to the predetermined instruction, start to classify the read image data into the second group, and
wherein the classifying unit is configured to, when the determining unit makes an initial determination that meets a requirement for the first group after the classifying unit starts to classify the read image data into the second group in the second mode, restart to classify the read image data into the first group, and cause the mode changing unit to restore the classifying mode to the first mode.

2. The reader according to claim 1, further comprising:
a forbidding unit configured to forbid the mode changing unit to change the classifying mode.

3. The reader according to claim 1, further comprising:
a setting unit configured to set a sheet side to be read by the reading unit for each of different document groups; and
a controller configured to control the reading unit to, in the first mode, read the sheet side set by the setting unit for each of the different document groups,
wherein the controller is configured to control the reading unit to, in the second mode, read both sheet sides for each of the different document groups.

4. The reader according to claim 3, further comprising:
wherein the different document groups contains a first document group to be read immediately after the reading unit starts reading and a second document group to be read following the first document group, and
wherein the setting unit comprises a selecting unit configured to accept an input to select a sheet side to be read for the second document group from selectable sheet sides, the selectable sheet sides being determined, based on a sheet side set by the setting unit for the first document group, such that the classifying unit can perform classifying for the second document group.

5. A reader comprising:
a reading unit configured to read image data on both sides of each of document sheets;
a determining unit configured to make a determination as to whether a predetermined one of both sides of each of the document sheets is blank, based on the image data read by the reading unit; and
a classifying unit configured to classify the image data read from each of the document sheets into one of different groups, based on the determination made by the determining unit;
wherein the classifying unit comprises a mode changing unit configured to change a classifying mode from a first mode to a second mode in response to a predetermined instruction,
wherein the classifying unit is configured to, in the first mode, classify the read image data into a predetermined one of the different groups, regardless of the determination by the determining unit,
wherein the classifying unit is configured to, in the second mode, classify the read image data into one of the different groups, based on the determination by the determining unit, and
wherein the classifying unit is configured to, immediately after the reading unit starts to read the image data of the document sheets, classify the read image data into the predetermined group in the first mode,
wherein the classifying unit is configured to, immediately after the reading unit
starts to read the image data of the document sheets, classify the read image data into a first group in the first mode,
wherein the classifying unit is configured to, in the second mode, classify the read image data into one of the first group and a second group different from the first group, based on the determination by the determining unit,
wherein the classifying unit is configured to, when the determining unit makes an initial determination that meets a requirement for the second group after the mode changing unit changes the classifying mode from the first mode to the second mode in response to the predetermined instruction, start to classify the read image data into the second group, and cause the mode changing unit to restore the classifying mode to the first mode, and
wherein the classifying unit is configured to, when classifying image data of a predetermined number of sheets into the second group after starting to classify the read image data into the second group, restart to classify the read image data into the first group.

6. The reader according to claim 5, further comprising:
a number-of-sheets accepting unit configured to previously accept the predetermined number of sheets of which the image data is to be classified into the second group.

7. A non-transitory computer readable medium having computer readable instructions stored thereon, the instructions, when executed by a processor configured to read a document, causing the processor to perform:
a reading step of reading image data on both sides of each of document sheets;
a determining step of making a determination as to whether a predetermined one of both sides of each of the document sheets is blank, based on the image data read in the reading step; and
a classifying step of classifying the image data read from each of the document sheets into one of different groups, based on the determination made in the determining step;
wherein the classifying step comprises the steps of:
changing a classifying mode from a first mode to a second mode in response to a predetermined instruction;
in the first mode, classifying the read image data into a predetermined one of the different groups, regardless of the determination in the determining step;
in the second mode, classifying the read image data into one of the different groups, based on the determination in the determining step; and
immediately after the image data of the document sheets starts to be read, classifying the read image data into the predetermined group in the first mode;
wherein the classifying step further comprises the steps of:
in the first mode, classifying the read image data into a first group, regardless of the determination in the determining step;
in the second mode, classifying the read image data into one of the first group and a second group different from the first group, based on the determination in the determining step;
when an initial determination is made in the determining step after the classifying mode is changed from the first mode to the second mode in response to the predetermined instruction, which initial determination meets a requirement for the second group, starting to classify the read image data into the second group; and
when an initial determination, made in the determining step after classifying the read image data into the second group in the second mode, meets a requirement for the first group, restarting to classify the read image data into the first group, and restoring the classifying mode to the first mode in the mode changing step.

8. The non-transitory computer readable medium according to claim 7,
wherein the instructions cause the processor to further perform:
a forbidding step of forbidding the classifying mode to be changed.

9. The non-transitory computer readable medium according to claim 7,
wherein the instructions cause the processor to further perform:
a setting step of setting a sheet side to be read for each of different document groups;
a first-mode reading step of, in the first mode, reading the sheet side set in the setting step for each of the different document groups; and
a second-mode reading step of, in the second mode, reading both sheet sides for each of the different document groups.

10. The non-transitory computer readable medium according to claim 9,
wherein the different document groups contains a first document group to be read immediately after the image data of the document sheets starts to be read and a second document group to be read following the first document group, and
wherein the setting step comprises a step of accepting an input to select a sheet side to be read for the second document group from selectable sheet sides, the selectable sheet sides being determined, based on a sheet side set to be read for the first document group, such that classifying for the second document group can be performed.

11. A non-transitory computer readable medium having computer readable instructions stored thereon, the instructions, when executed by a processor configured to read a document, causing the processor to perform:
a reading step of reading image data on both sides of each of document sheets;
a determining step of making a determination as to whether a predetermined one of both sides of each of the document sheets is blank, based on the image data read in the reading step; and
a classifying step of classifying the image data read from each of the document sheets into one of different groups, based on the determination made in the determining step;
wherein the classifying step comprises the steps of:
changing a classifying mode from a first mode to a second mode in response to a predetermined instruction;
in the first mode, classifying the read image data into a predetermined one of the different groups, regardless of the determination in the determining step;
in the second mode, classifying the read image data into one of the different groups, based on the determination in the determining step; and
immediately after the image data of the document sheets starts to be read, classifying the read image data into the predetermined group in the first mode;
wherein the classifying step further comprises the steps of:
immediately after the image data of the document sheets starts to be read, classifying the read image data into a first group in the first mode;
in the second mode, classifying the read image data into one of the first group and a second group different from the first group, based on the determination by the determining unit,
when an initial determination is made in the determining step after the classifying mode is changed from the first mode to the second mode in response to the predetermined instruction, which initial determination meets a requirement for the second group, starting to classify the read image data into the second group, and restoring the classifying mode to the first mode, and
when classifying image data of a predetermined number of sheets into the second group after starting to classify the read image data into the second group, restarting to classify the read image data into the first group.

12. The non-transitory computer readable medium according to claim 11, wherein the instructions cause the processor to further perform:

a number-of-sheets accepting step of previously accepting the predetermined number of sheets of which the image data is to be classified into the second group.

13. A method adapted to be implemented on a processor configured to read a document, comprising:

reading image data on both sides of each of document sheets;

determining whether a predetermined one of both sides of each of the document sheets is blank, based on the image data read in the reading step;

classifying the image data read from each of the document sheets into one of different groups, based on the determination of the determining step;

changing a classifying mode from a first mode to a second mode in response to a predetermined instruction;

classifying, in the first mode, the read image data into a first group of the different groups, regardless of the determination of the determining step;

classifying, in the second mode, the read image data into one of the first group and a second group of the different groups, based on the determination by the determining step, the second group being different from the first group;

classifying the read image data into the first group in the first mode immediately after reading the image data of the document sheets;

starting to classify the read image data into the second group when making an initial determination that meets a requirement for the second group after changing the classifying mode from the first mode to the second mode in response to the predetermined instruction; and restarting to classify the read image data into the first group and restoring the classifying mode to the first mode when making an initial determination that meets a requirement for the first group after starting to classify the read image data into the second group in the second mode.

* * * * *